US009069450B2

(12) United States Patent
Samokar et al.

(10) Patent No.: US 9,069,450 B2
(45) Date of Patent: *Jun. 30, 2015

(54) MULTI-MODAL/MULTI-CHANNEL APPLICATION TOOL ARCHITECTURE

(71) Applicant: AT&T INTELLECTUAL PROPERTY I, L.P., Atlanta, GA (US)

(72) Inventors: Robert Samokar, North Haven, CT (US); Jayant Thomas, San Ramon, CA (US); Stan Pisle, Berkeley, CA (US); John Tadlock, Austin, TX (US)

(73) Assignee: AT&T INTELLECTUAL PROPERTY, I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/196,212

(22) Filed: Mar. 4, 2014

(65) Prior Publication Data

US 2014/0229868 A1    Aug. 14, 2014

Related U.S. Application Data

(63) Continuation of application No. 12/255,158, filed on Oct. 21, 2008, now Pat. No. 8,707,258.

(51) Int. Cl.
   *G06F 9/44* (2006.01)
   *G06F 3/0484* (2013.01)
   *H04Q 3/00* (2006.01)

(52) U.S. Cl.
   CPC ............ *G06F 3/0484* (2013.01); *H04Q 3/0062* (2013.01); *H04Q 2213/13109* (2013.01); *H04Q 2213/13175* (2013.01); *H04Q 2213/13349* (2013.01)

(58) Field of Classification Search
   USPC ........................................................ 717/117
   See application file for complete search history.

(56) References Cited

U.S. PATENT DOCUMENTS

| 7,167,830 | B2 | 1/2007 | Sravanapudi et al. |
|---|---|---|---|
| 7,184,786 | B2 | 2/2007 | Mumick et al. |
| 7,269,562 | B2 | 9/2007 | Leask et al. |
| 7,418,086 | B2 | 8/2008 | Sravanapudi et al. |
| 7,831,546 | B2 | 11/2010 | Crapp et al. |
| 2004/0220810 | A1 | 11/2004 | Leask et al. |
| 2006/0153198 | A1 | 7/2006 | Chadha |
| 2007/0005366 | A1 | 1/2007 | Sravanapudi et al. |
| 2008/0004046 | A1 | 1/2008 | Mumick et al. |
| 2008/0148014 | A1 | 6/2008 | Boulange |
| 2009/0210534 | A1 | 8/2009 | O'Connell |
| 2009/0282471 | A1 | 11/2009 | Green et al. |

Primary Examiner — Chun-Kuan Lee
(74) Attorney, Agent, or Firm — Greenblum & Bernstein, P.L.C.

(57) ABSTRACT

A computer with a processor and a memory is used to set instructions for both a first component of a service and a second component of the service. The instructions include a flow of dialogs to present to requesters of the service to obtain information. Each instruction includes a dialog to present to the requesters of the service to obtain information. The first component of the service is provided via a first user interface over a first communication channel using a first communication mode. The second component of the service is provided via a second user interface over a second communication channel using a second communication mode. The first component of the service and the second component of the service are provided continuously in a single session in accordance with the instructions using a common rule set of the instructions.

20 Claims, 8 Drawing Sheets

MULTI-MODAL/MULTI-CHANNEL APPLICATION TOOL ARCHITECTURE

CROSS-REFERENCE TO RELATED APPLICATIONS

This is a continuation of pending U.S. patent application Ser. No. 12/255,158, filed on Oct. 21, 2008, the contents of which are expressly incorporated herein by reference in their entireties.

BACKGROUND

1. Field of the Disclosure

The present disclosure relates to multi-modal services. More particularly, the present disclosure relates to a multi-modal/multi-channel application tool architecture for providing multi-modal services.

2. Background Information

Communications service providers are known to provide certain support services to telephone users over the public switched telephone network (PSTN) with a human agent or an automated agent such as an interactive voice response (IVR) unit. Due to the proliferation of communications devices such as computers and personal digital assistants, communications service providers have in recent years adapted to providing services using other communications modes including Internet pages, email and chat. Agents, including automated agents, are grouped and dedicated according to communications mode, and each group uses individual presentation layers developed in accordance with user interfaces appropriate for the communications mode to which the agents are dedicated. Business logic for the communications service provider is recreated for each group and integrated with the individual presentation layers.

DETAILED DESCRIPTION

Figure 1:
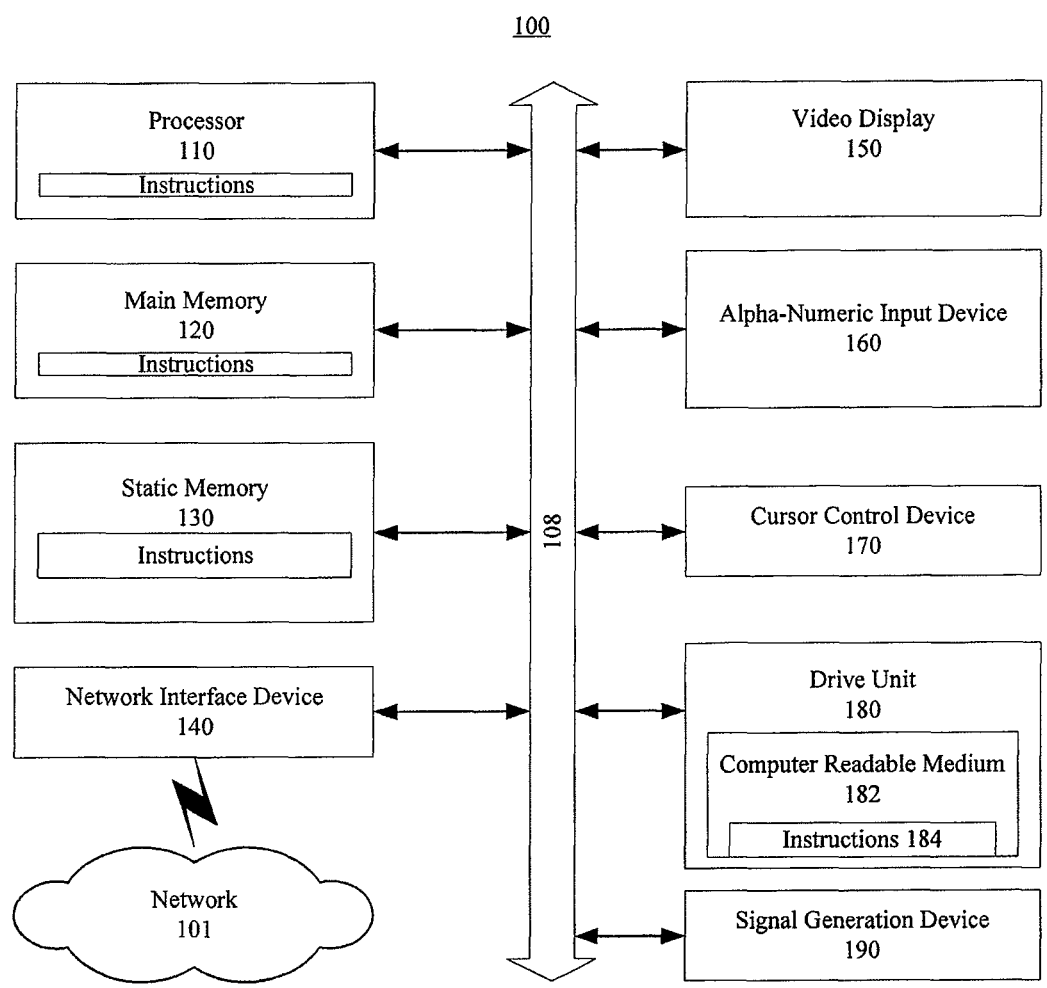
FIG. 1 shows an exemplary general computer system that includes a set of instructions for implementing a multi-modal/multi-channel application tool architecture.

In view of the foregoing, the present disclosure, through one or more of its various aspects, embodiments and/or specific features or sub-components, is thus intended to bring out one or more of the advantages as specifically noted below.

According to an aspect of the present disclosure, a method for integrating services includes providing a first component of a service via a first user interface over a first communications channel using a first communications mode. A second component of the service is provided via a second user interface over a second communications channel using a second communications mode. The first component of the service and the second component of the service are provided continuously in a single session using a common rule set for user interface dialog management.

According to another aspect of the present disclosure, the first component and second component are implemented using different communications standards.

According to yet another aspect of the present disclosure, the first component and second component are implemented using different communications protocols.

According to still another aspect of the present disclosure, the first component and second component are implemented using different programming languages.

According to another aspect of the present disclosure, the first user interface is provided in accordance with a first user interface specification, and the second user interface is provided in accordance with a second user interface specification.

According to yet another aspect of the present disclosure, a first user interface template and second user interface template are stored and accessed separate from a rules engine used to manage transitions for and between the first component and the second component of the service.

According to still another aspect of the present disclosure, the method further includes determining, using the rules engine, a dialog flow which includes providing the first component of the service and the second component of the service.

According to another aspect of the present disclosure, the method includes determining, using the rules engine, an application flow which includes providing the first component of the service and the second component of the service.

According to yet another aspect of the present disclosure, a set of predefined variables are used to provide the first component of the service and the second component of the service in accordance with rules of the rules engine.

According to still another aspect of the present disclosure, the providing the first component of the service and providing the second component of the service vary in accordance with the predefined variables.

According to yet another aspect of the present disclosure, a first user interface template and second user interface template are stored and accessed from a rules engine used to manage transitions for and between the first component and the second component of the service.

According to another aspect of the present disclosure, the first mode is a voice wireless application protocol.

According to yet another aspect of the present disclosure, the first mode is a markup-language text-based mode.

According to still another aspect of the present disclosure, the method further includes storing the first user interface template and the second user interface template in a content repository.

According to another aspect of the present disclosure, the method includes integrating rules of the first user interface specification and the second user interface specification with an application flow which includes providing the first component of the service and the second component of the service.

According to yet another aspect of the present disclosure, the method also includes converting an application flow which includes providing the first component of the service into rules of the first user interface specification; updating the rules of the first user interface specification; and converting the updated rules of the first user interface specification back to the application flow which includes providing the first component of the service.

According to an aspect of the present disclosure, a method for managing services includes providing a first component of a service via a first user interface over a first communications channel using a first communications mode. A second component of the service is provided via a second user interface over a second communications channel using a second communications mode. The first component of the service and the second component of the service are provided in accordance with stored rules of user interface specifications accessed from a rules engine used to manage transitions for and between the first component and the second component of the service.

According to another aspect of the present disclosure, the service transitions from the first component of the service to the second component of the service based on interaction with a recipient of the service.

According to yet another aspect of the present disclosure, the first component of the service and the second component of the service are provided continuously in a single session.

According to still another aspect of the present disclosure, an application flow manager manages the transition from the first component of the service to the second component of the service.

According to another aspect of the present disclosure, the first component of the service is provided by providing a dialog to the recipient of the service.

According to yet another aspect of the present disclosure, the second component of the service is provided by providing a dialog to the recipient of the service.

According to still another aspect of the present disclosure, the service is a customer service provided by a communications service provider.

According to another aspect of the present disclosure, the first component of the service is provided by an interactive voice response unit.

According to yet another aspect of the present disclosure, the second component of the service is provided by an Internet page.

According to still another aspect of the present disclosure, the second component of the service is provided by email.

According to another aspect of the present disclosure, the second component of the service is provided by chat functionality.

According to yet another aspect of the present disclosure, the second component of the service is provided using wireless application protocol.

According to still another aspect of the present disclosure, an application flow manager manages the transition from the first component of the service to the second component of the service using transition rules that selectively determine which of a plurality of components of the service to provide as the second component of the service.

FIG. 1 is an illustrative embodiment of a general computer system, on which aspects of a multi-modal/multi-channel application tool architecture can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (personal digital assistant), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

An architecture for developing and providing multi-modal/multi-channel application services via multiple user interfaces is described in the present disclosure. The multi-modal/multi-channel applications may be provided using a common rule set for user interface dialog management. The multi-modal/multi-channel applications may be provided in accordance with stored user interface specifications accessed from a rules engine used to manage transitions for and between dialogs of the application services provided in different modes.

Multi-modal communications are communications where information is transported by and/or in multiple modes. Communications modes can be distinguished by the type of information carried in the communications and the manner in which the communications are transmitted. Types of information may include voice, text and graphics. Manners in which communications are transmitted may vary by standards and protocols to which the communications adhere, or by programming languages used to code the information. A communications standard is a definition or format approved by a recognized standards organization, such as the International Telecommunication Union (ITU), the Institute of Electrical and Electronic Engineers (IEEE), the International Telecommunications Union (ITU), and the International Standards Organization (ISO). Exemplary communications standards include G.711, the global system for mobile communications (GSM) standard, the interim standard 95 (IS-95); the code division multiple access (CDMA) 2000 standards, i.e., CDMA2000 1xRTT, CDMA2000 EV-DO, and CDMA2000 EV-DV; digital subscriber line (DSL) standards, fibre channel standards (FCS), and motion picture expert group (MPEG) standards. A communications protocol is the set of standard rules for data representation, signaling, authentication and error detection required to send information over a communications channel. Exemplary communications protocols include point to point protocol (PPP), Internet protocol (IP), transmission control protocol (TCP), and simple mail transfer protocol (SMTP).

Multi-modal applications as described herein enable a user to transition within and between service components in different communications modes using one or more communications devices. As an example, a user can obtain a customer care service by dialing a toll free number from a communications device to reach an interactive voice response unit and obtain an interactive voice response service component. The user communicates with the interactive voice response unit by receiving speech information from the interactive voice response unit and providing dual tone multifrequency (DTMF) signals and/or speech to the interactive voice response unit. At a point in the interactive voice response service component, a determination is made, either by the interactive voice response unit or a controller which controls the interactive voice response unit, to transition to a second short message service (SMS) component or wireless application protocol service component. A short message service component or wireless application protocol service component is provided to the user in a short message service communications mode or a wireless application protocol communications mode, and over a different user interface (e.g. a graphical user interface) than the first service component. The second (short message service or wireless application protocol) service component may be provided to the user using either a multi-modal communications device by which the user receives the first (interactive voice response) service component, or a communications device different than the communications device by which the user receives the first (interactive voice response) service component.

A channel in communications may be defined by a route through which information is transmitted, a frequency bandwidth in which information is transmitted, a physical link over which information is transmitted, an algorithm by which a signal is transmitted over multiple continuously varying portions of the frequency spectrum (e.g., a spread spectrum), or an address or party at an endpoint of the channel, such that any one channel is discernible. Thus, for example, a channel changes when communications with a requester are switched between agents, even though the requester and the communications mode remain the same. The multi-modal/multi-channel services described in the present disclosure may be components provided as a single, continuous service over multiple channels.

A user interface is the totality of mechanisms by which a user interacts with a system such as a personal communications device or remote system in communication with the personal communications device. The user interface accepts input to allow the user to manipulate the personal communications device or remote system and provides output to allow the system to produce the effect of the user's manipulation. The user interface allows a user to receive and/or send audible and/or visual information using audible senses, visual senses and/or touch senses.

According to the present disclosure, the user interface includes the arrangement and presentation of audible and/or visual information to remote users. The arrangement and presentation of audible and/or visual information may be prepared in accordance with the needs of a service provider to provide information to or request information from a human or automated agent over the one or more networks using an electronic device. Thus, a user interface in a voice component of a service includes the presentation (e.g., voice and content) of information to be provided to the user, including inquiries to be presented to the user and responses to anticipated inquiries from the user. Additionally, a user interface in email, Internet or chat components of a service includes the presentation (e.g., arrangement and content) of information, including input mechanisms such as graphical data entry windows and checkboxes.

A graphical user interface is a programmed visual representation rendered by a computer program to enable a user to interact with a system such as a personal communications device or remote system in communication with the personal communications device. Well known graphical user interfaces include features such as pointers, icons, a desktop for grouping and arranging icons, windows to divide a screen into areas, and menus. The user manipulates input devices, such as a mouse, keyboard or touch screen to manipulate the features of the graphical user interface to provide and receive information.

The multi-modal/multi-channel services provided in accordance with the present disclosure are provided as components in different modes of a single service. Typically, a user initiates communications with the service provider, and the service provider provides human or automated agents to interact with the users and provide the service. Customer interactions according to the present disclosure are anticipated by the service provider, such that the service provider uses pre-authored application flows (see below) and dialog flows (see below) in the application flows to ensure consistency in the services provided to users.

A human agent may be a human who communicates over one or more networks. The networks over which a human may communicate include the public switched telephone network, a wireless network, and the Internet using voice over Internet protocol (VoIP) or wireless application protocol. An automated agent may be a computer with a processor for processing a script of instructions in order to communicate and interact with the user over the one or more networks.

A dialog in the context of communications using a graphical user interface (GUI) is a temporary window in the graphical user interface that appears in order to request information from a user. In the context of communications with a service provider in accordance with the present disclosure, a dialog is a temporary state in a component of a service interaction between a user and a human or automated agent of the service provider. Each dialog includes the human or automated agent providing information to the user and/or requesting and/or receiving information from the user, and the dialog may be presented to the user in the appropriate context of any user interface.

Figure 2:
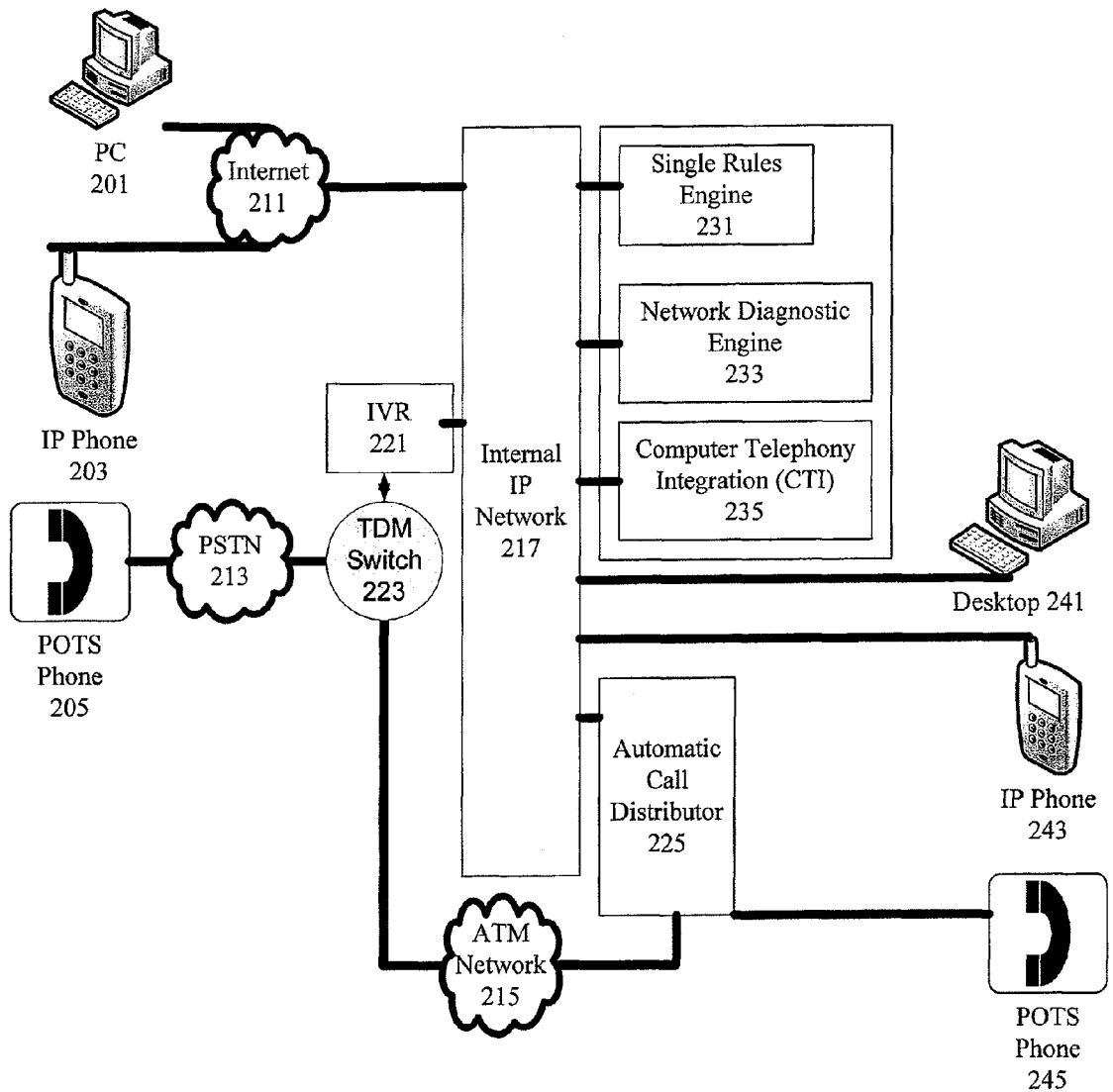
FIG. 2 shows an exemplary multi-modal/multi-channel customer contact application tool architecture, according to an aspect of the present disclosure.

FIG. 2 shows an exemplary multi-modal/multi-channel customer contact application tool architecture, according to one or more aspects of the present disclosure. As shown, user devices include a personal computer (PC) 201 and Internet protocol (IP) phone 203 that communicate over the Internet 211, and a plain old telephone system (POTS) phone 205 that communicates over the public switched telephone network 213. The personal computer 201 and Internet protocol phone 203 communicate over the Internet 211 and an internal Internet protocol network 217 of a service provider. The plain old telephone system phone 205 communicates with an interactive voice response unit 221 via a switching network that includes a time division multiplexing (TDM) switch 223. The interactive voice response unit 221 also communicates over the internal Internet protocol network 217. The plain old telephone system phone 205 also communicates with an agent using a plain old telephone system phone 245 via an asynchronous transfer mode network 215 and an automatic call distributor 225. The automatic call distributor 225 is an apparatus that receives calls and distributes the calls to agents such as the agent using the plain old telephone system 245. Similar to the interactive voice response unit 221, the automatic call distributor 225 also communicates over the internal Internet protocol network 217. Agents such as the agent using the plain old telephone system phone 245 also may use a desktop 241 and an Internet protocol phone 243, each of which communicate over the internal Internet protocol network 217.

A single rules engine 231, a network diagnostic engine 233, and a computer telephony integration system 235 are each accessible through the internal Internet protocol network 217. The single rules engine 231 is used to provide a common rule set for user interface dialog management for service components provided using multiple different communications modes. The single rules engine 231 stores application flows and dialog flows for the application flow, so that transitions between service components in different communications modes are ascertainable by the agent providing the first service component. The common rule set implemented by the single rules engine 231 also governs which user interface to present for each dialog. Multiple individual dialogs for each component are provided sequentially, and vary based on interaction with the counterparty who communications with the agents providing the components, and transitions between dialogs in a component and between components in different modes are governed by the common rule set.

As an example, a service that transitions from a voice component to a (text) chat component will transition in accordance with a dialog flow stored by and/or retrieved using the single rules engine 231. When an agent communicates with a user over a voice network such as the plain old telephone system or a wireless phone network, the agent may follow a scripted dialog flow that instructs the agent to obtain information from the user in a predetermined order. When the agent determines that the user has a (text) chat capability using, for example, a personal digital assistant or personal computer, the dialog flow may instruct the agent to initiate a chat session with the user, or pass the service session to another agent to initiate the chat session with the user. The chat session will then also follow a scripted dialog flow. Indeed, the dialog flows for providing the multi-modal service are components of a single application flow in this example, and the single rules engine 231 is used to ensure both that agents proceed in accordance with the application flow and that each dialog in the dialog flows is linked to a user interface for presentation to the user.

Using the multi-modal/multi-channel application tool architecture of the present disclosure, the single rules engine 231 enables a transition from the voice mode of communications to a (text) chat component. Of course, the transition in the dialog flows between different communications modes is not limited to a transition between a voice mode to a (text) chat mode. Rather, the single rules engine 231 of the embodiment shown in FIG. 2 enables transitions between service components using any different types of communications modes that can be provided in voice, text or graphics modes and using any communications modes according to different communications standards, protocols and programming languages. Thus, a user with a multi-modal communications device such as an Internet protocol phone 203, or a user with multiple different communications devices that use different modes, can obtain a communications service continuously in two or more service components using two or more communications modes. The transitions between individual dialog components in each service component are managed using the rules of the single rules engine 231. That is, human or automated agents will either switch communications modes or pass responsibility to another human or automated agent to transition between a first communications mode and a second communications mode for different components of a continuously-provided service.

Figure 3:
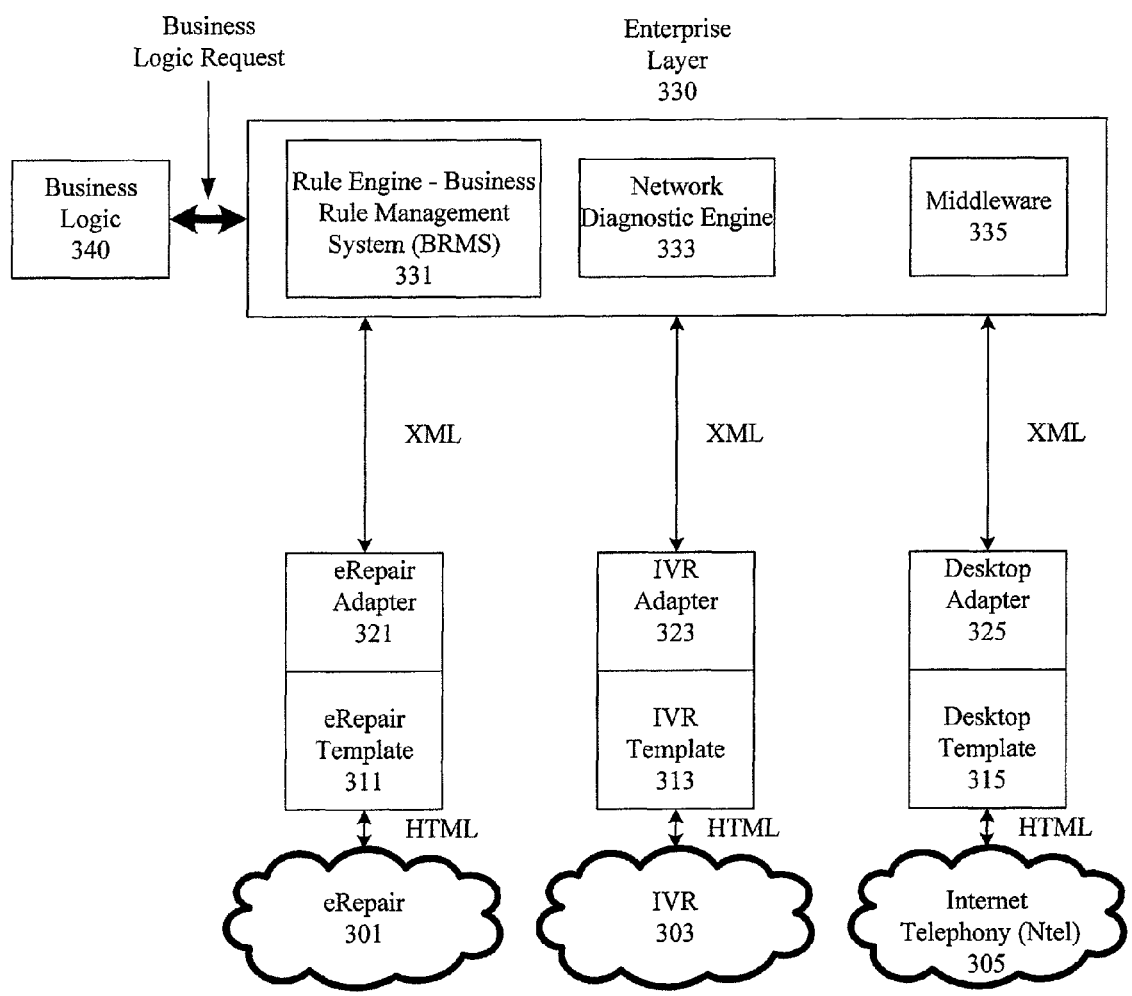
FIG. 3 shows an exemplary multi-modal/multi-channel application tool architecture, according to an aspect of the present disclosure.

FIG. 3 shows an exemplary multi-modal/multi-channel application tool architecture in accordance with one or more aspects of the present disclosure. As shown, an eRepair service 301 interfaces with an eRepair template 311 via hypertext markup language (HTML). The eRepair template 311, in turn, interfaces with an eRepair adapter 321. The eRepair adapter 321 communicates with an enterprise layer 330 using extensible markup language (XML). The enterprise layer includes a rule engine-business rule management system (BRMS) 331, a network diagnostic engine 333 and middleware 335.

An interactive voice response service 303 interfaces with an interactive voice response template 313 via hypertext markup language. The interactive voice response template 313, in turn, interfaces with an interactive voice response adapter 323. The interactive voice response adapter 323 communicates with the enterprise layer 330 using extensible markup language.

An Internet telephony (Ntel) service 305 interfaces with a desktop template 315 via hypertext markup language. The desktop template 315, in turn, interfaces with a desktop adapter 325. The desktop adapter 325 communicates with the enterprise layer 330 using extensible markup language.

In FIG. 3, the enterprise layer 330 includes the rule engine-business rule management system 331. Business logic 340 is used to provision the rule engine-business rule management system 331, and the rule engine—business rule management system 331 provides the common rule set for transitioning between multi-modal service component dialogs provided by eRepair rules at 301, interactive voice response 303 and Internet telephony 305. User interfaces for different dialogs in an eRepair dialog flow are provided to eRepair service 301 using the eRepair template 311. User interfaces for different dialogs in an interactive voice response dialog flow are provided to interactive voice response 303 using the interactive voice response template 313. User interfaces for different dialogs in an Internet telephony dialog flow are provided to Internet telephony 305 using the desktop template 315. Each of the templates 311, 313 and 315 is populated in accordance with rules of an appropriate user interface specification for the communications mode in which user interfaces are provided based on the templates.

As described above with respect to the embodiment of FIG. 3, business logic 340 and the rule engine—business rule management system 331 are implemented separately from the various modal user interface templates 311, 313 and 315. Business logic 340 reflects broader high-level concerns than technical user interface concerns relating specifically to the user interfaces for the services provided using the multi-modal/multi-channel architecture in FIG. 3. The business logic 340 is therefore separated from the multi-modal user interface templates 311, 313, 315, and the enterprise layer 330 includes the rule engine—business rule management system 331 by which dialog transitions are managed. As a result, changes to the rules implemented using the rule engine 331 can be made without necessarily modifying the multi-modal user interface templates 311, 313, 315. In the embodiment shown in FIG. 3, rules of user interface specifications, that govern how to populate user interface templates to provide user interfaces, are integrated into the rules of the rules engine—business rule management system 331.

Figure 4:
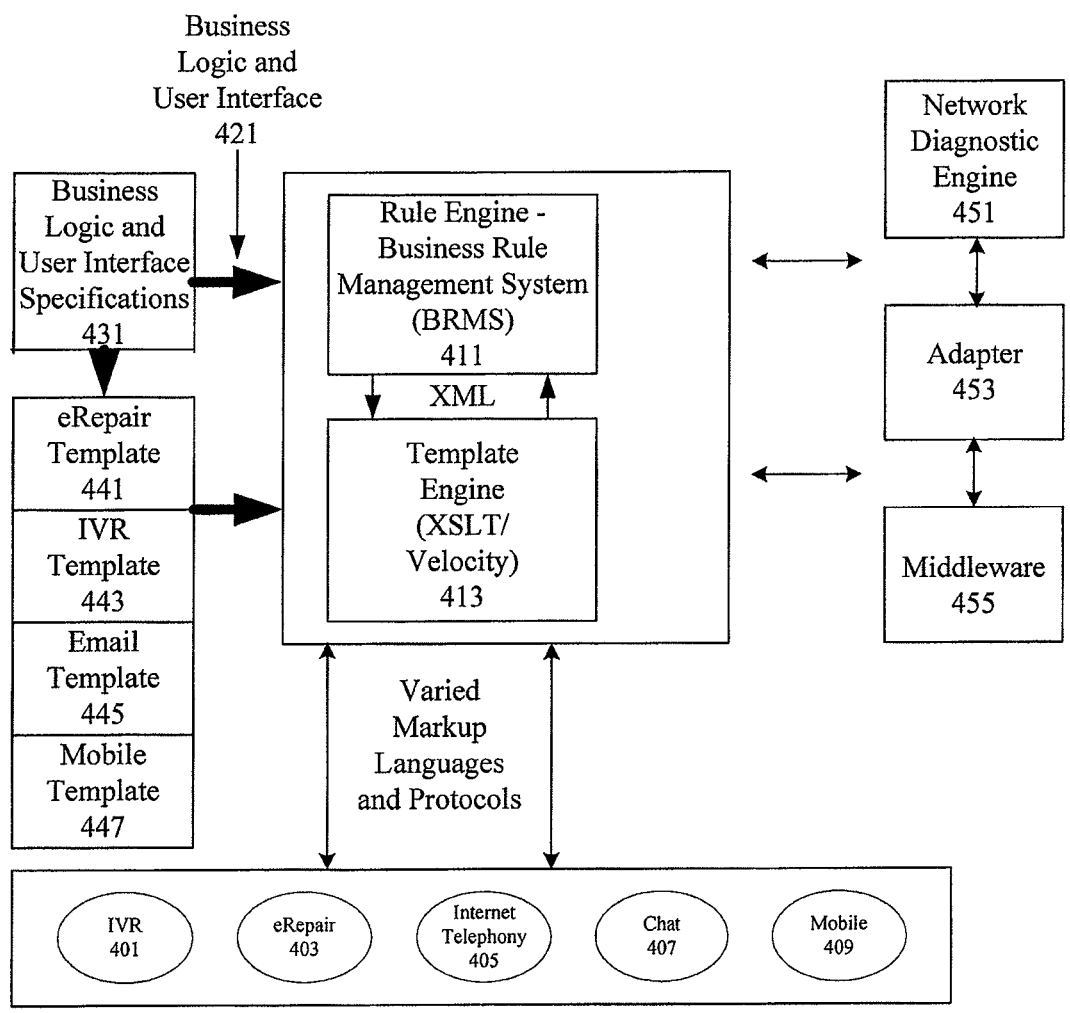
FIG. 4 shows another exemplary multi-modal/multi-channel application tool architecture, according to an aspect of the present disclosure.

FIG. 4 shows another exemplary multi-modal/multi-channel application tool architecture in accordance with one or more aspects of the present disclosure. As shown, different modes of communication between requesters and agents include interactive voice response 401, eRepair 403, Internet telephony (405), chat 407 and mobile 409. The different communication modes enable communications between the requesters and agents using varied markup languages such as extensible markup language and protocols such as wireless application protocol (WAP). A template engine 413 is provided to the back-end system used by the agents to interact with the customer. The template engine 413 may be Apache Velocity or use extensible style sheet language transformation (XSLT). The template engine 413 applies a stylesheet to a source document to define how information is to be provided to a user in a result document. For example, the Apache Velocity template engine is Java-based and references objects defined in Java code to separate the presentation layer and business layer in a Web application. Exemplary uses of Apache Velocity are generation of automatic emails using an email template stored in a text file, or conversion of documents in an extensible markup language file into a styled hypertext markup language document.

As shown in FIG. 4, a business rule management system 411 is separated from the template engine 413, but also interacts with the template engine 413 in order to ensure that data is presented in accordance with the business rules of the service provider while also conforming to various user interface specifications 431 used to create multi-modal templates 441, 443, 445 and 447 as shown. The templates shown in the exemplary embodiment of FIG. 4 include an eRepair template 441, an interactive voice response template 443, an email template 445 and a mobile template 447, and are populated in compliance with user interface specifications 431 to generate individual user interfaces. The templates 441, 443, 445 and 447 are populated to generate individual user interfaces for individual dialogs of dialog flows for application flows. Therefore, a dialog flow for a service component may be determined with reference to the rule Engine—business rule management system 411, and individual user interfaces for each dialog are obtained and presented using the template engine 413.

In FIG. 4, business logic and user interface specifications are provided from a business logic and user interface specifications repository 431. Whereas the business logic 431 is used to create dialog flows for implementation by the rule engine—business rule management system 411, the user interface specifications are used to populate user interface templates for the various modes shown in 441, 443, 445 and 447. The user interface templates are used to implement individual user interfaces for different dialogs of the dialog flows by the template engine 413.

In FIG. 4, the business rule management system 411 and the template engine 413 also use a network diagnostic engine 451, middleware 455 or adapter 453 to provide for interoperability in distributed architectures. The network diagnostic engine 451, middleware 455 or adapter 453 thus interface applications working on different operating systems. For example, the middleware 455 may include web servers and application servers which otherwise provide single mode communications services to requesters via the agents 401, 403, 405, 407 and 409.

In the embodiment of FIG. 4, the rule engine—business rule management system 411 and the template engine 413 are used to provide a common rule set for user interface dialog management across multi-modal components of a continuous single service session. That is, dialog flow is determined in accordance with rules stored and/or implemented by the rule engine—business rule management system 411, whereas user interfaces are generated in accordance with templates stored and/or implemented by the template engine 413. Therefore, user interfaces are created, managed and implemented separate from dialog flows and individual dialogs, though individual dialog states may be linked to individual user interface templates that are populated for presentation to users for the individual dialog states. Therefore, the rule engine—business rule management system 411 and template engine 413 provide multi-modal/multi-channel communications sessions based on a common ruleset that enables transitions between dialog states and dialog flows in the different communications modes.

In FIG. 4, user interface templates including the eRepair template 441, interactive voice response template 443, email template 445 and mobile template 447, are provided to the template engine 413. The rule engine—business rule management system 411 also interfaces with the template engine 413. In comparison with the embodiment of FIG. 3, the embodiment of FIG. 4 provides the template engine 413 in place of the eRepair adapter 321, the interactive voice response adapter 323 and the desktop adapter 325. As in the embodiment of FIG. 3, the rule engine—business rule management system 411 in FIG. 4 is provided and provisioned separately from the template engine 413 and multi-modal user interface templates 441, 443, 445 and 447. Also as in the embodiment of FIG. 3, rule engine—business rule management system 411 reflects broader high-level concerns than technical user interface concerns relating specifically to the user interfaces for the services provided by the entity providing the services using the multi-modal/multi-channel architecture in FIG. 4. As a result, changes to the rules implemented using the user interface templates can be made without necessarily changing the logic of the rule engine—business rule management system 411.

Figure 7:
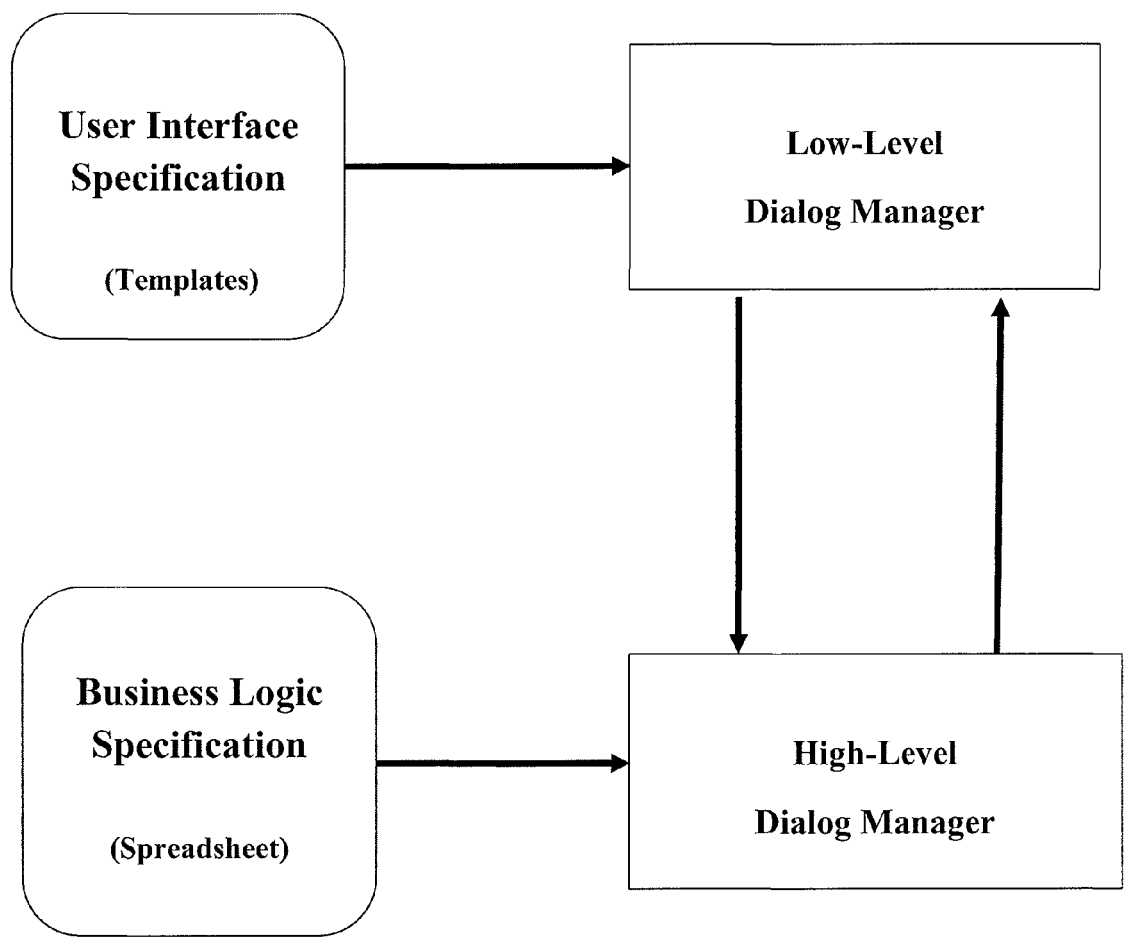
FIG. 7 shows a conceptual view of the separation of user interface concerns and business logic concerns, according to an aspect of the present disclosure.

FIG. 7 shows a conceptual view of the separation of user interface concerns and business logic concerns, in accordance with one or more aspects of the present disclosure. As shown, user interface specifications (templates) are provided to a low-level dialog manager, whereas a business logic specification (spreadsheet) is provided to a high-level dialog manager. The low-level dialog manager and high-level dialog manager communicate with one another in the conceptual view of FIG. 7, but separate the high-level business logic concerns from the lower level technical user interface concerns. The high-level dialog manager in FIG. 7 corresponds to the rule engine—business rule management system 411 in the embodiment of FIG. 4 and the rule engine—business rule management system 331 in the embodiment of FIG. 3. The low-level dialog manager in FIG. 7 corresponds to the template engine 413 in the embodiment of FIG. 4 and the eRepair adapter 321, interactive voice response adapter 323 and the desktop adapter 325 in the embodiment of FIG. 3.

Figure 8:
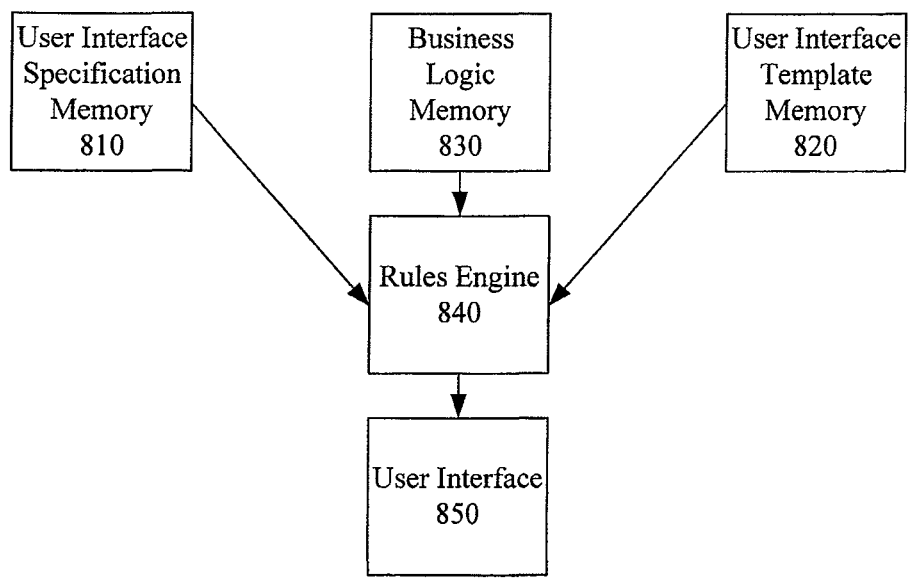
FIG. 8 shows a conceptual view of the relationship between user interface specifications, business logic, user interface templates, a rules engine and a user interface.

FIG. 8 shows a conceptual view of the relationship between user interface specifications, business logic, user interface templates, a rules engine and a user interface. A user interface specification memory 810 is provided to store user interface specifications. User interface specifications are rules applied by a rules engine 840 for populating user interface templates stored in user interface template memory 830 to generate a user interface 850. A business logic memory 830 stores business logic rules applied by the rules engine 840 for transitioning between dialog states within and between different components of a service. The rules engine 840 is used to manage transitions for and between components and individual dialog states of a service. The rules engine 840 may include a memory that stores integrated logic based on the user interface specification rules and business logic rules. The rules engine 840 may also include a processor that processes the integrated logic in order to retrieve and populate user interface templates for each dialog state, as well as determine transitions between dialog states within and between different components of a service. Each dialog state in a dialog or application flow is therefore linked with a user interface template to populate in accordance with the logic based on the user interface specification rules.

Figure 5:
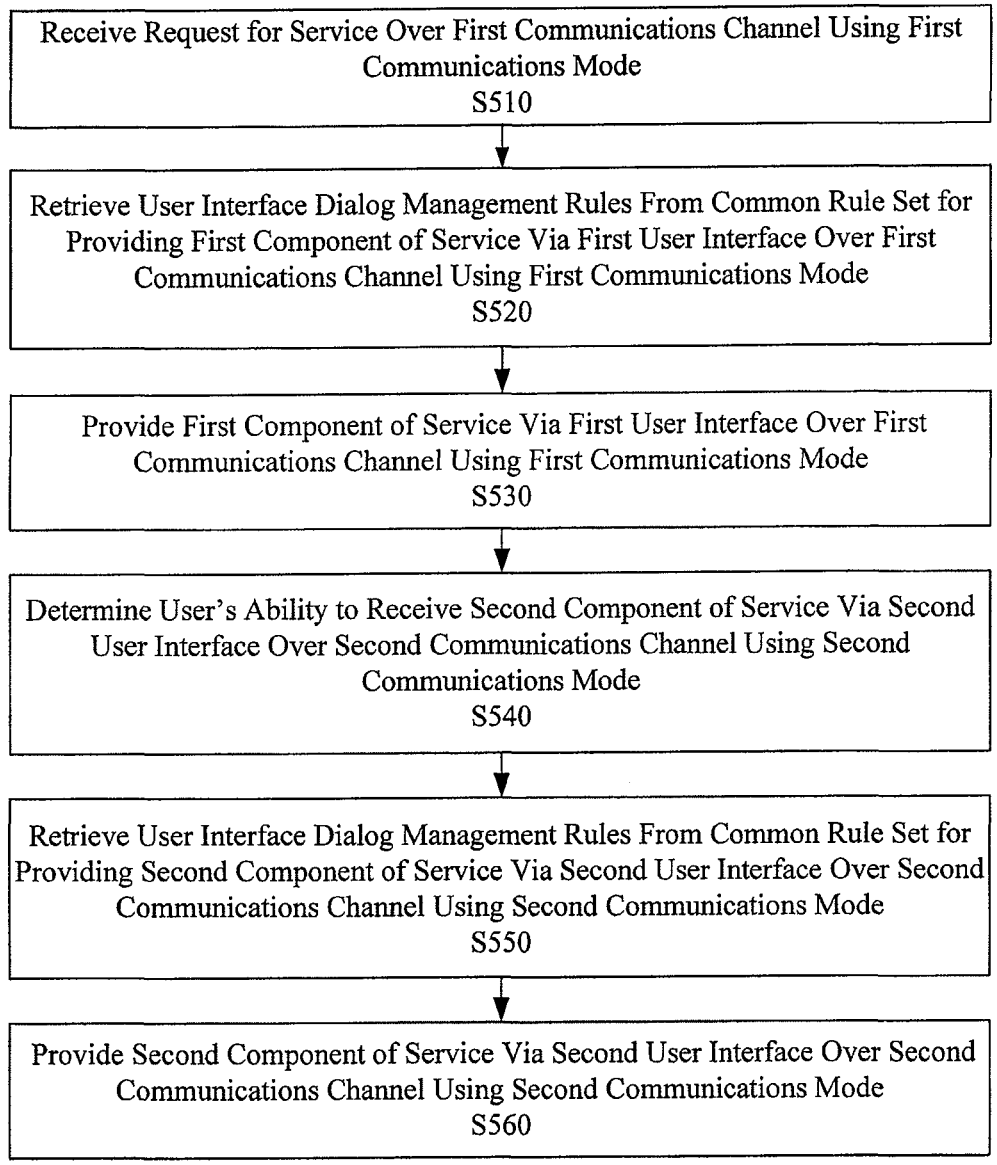
FIG. 5 shows an exemplary method of providing integrated services using a multi-modal/multi-channel application tool architecture, according to an aspect of the present disclosure.

FIG. 5 shows an exemplary overview method for integrating services in accordance with one or more aspects of the present disclosure. At S510, a request for service is received over a first communications channel using a first communications mode. At S520, user interface dialog management rules are retrieved from a common rule set for providing a first component of service via a first user interface over the first communications channel using the first communications mode. At S530, a first component of the service is provided via a first user interface over the first communications channel using the first communications mode. At S540, a user's ability to receive a second component of the service via a second user interface over a second communications channel using a second communications mode is determined. At S550, user interface dialog management rules are retrieved from the common rule set for providing the second component of service via the second user interface over the second communications channel using the second communications mode. At S560, the second component of the service is provided via the second user interface over the second communications channel using the second communications mode.

Figure 6:
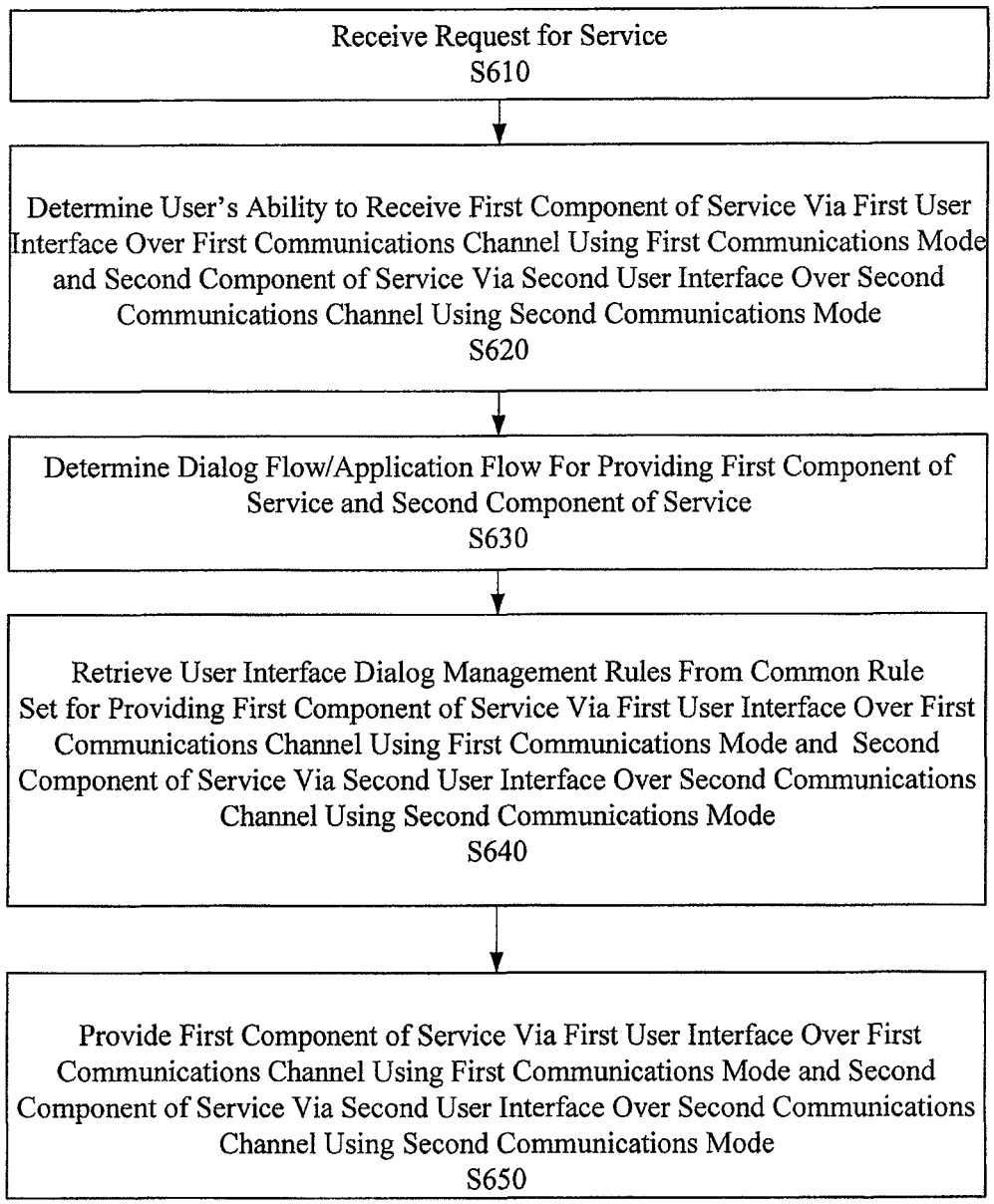
FIG. 6 shows another exemplary method of providing integrated services using a multi-modal/multi-channel application tool architecture, according to an aspect of the present disclosure.

FIG. 6 shows another exemplary overview method for integrating services in accordance with one or more aspects of the present disclosure. At S610, a request for service is received. The request may be received over any communications channel via communications in any communications mode. At S620, a determination is made as to the communications capabilities of the requestor, and the compatibility of the requester's communications capabilities with the communications capabilities of the service provider. In particular, at S620 a determination is made as to the requester's ability to receive a first component of the requested service via a first user interface over a first communications channel using a first communications mode. A determination is also made as to the requester's ability to receive a second component of the service via a second user interface over a second communications channel using a second communications mode.

At S630, a dialog flow as part of an application flow is determined for providing the first component of the service and the second component of the service. Of course, the dialog flow as part of the application flow may include more than two components in more than two communications modes, and the present disclosure describes providing dialog flows with two components only for convenience of description. At S640, user interface dialog management rules are determined from a common rule set for providing the first component of service via the first user interface over the first communications channel using the first communications mode and the second component of service via the second user interface over the second communications channel using the second communications mode. The common rule set is an integrated rule set that provides for transitions between different states when providing the service, and the common rule set therefore includes rules for providing different components of the service in different communications modes via different communications channels. At S650, the first component of the service is provided via a first user interface over the first communications channel using the first communications mode. The second component of the service is provided via the second user interface over the second communications channel using the second communications mode.

In comparison with the embodiment shown in FIG. 5, the embodiment of FIG. 6 determines a requester's ability to communicate over different communications channels in different communications modes as an initial matter, rather than after providing the first component of the service. Thus, the multi-modal dialog flows of the application flow may be determined either as an initial matter at or towards the beginning of a communication session, or during the communications session after all or part of a service component has been provided over a first channel in a first mode. For example, an interactive voice response unit may provide a voice component of a service to a requester, and then forward an interactive dialog screen or a link to a webpage to the requester using, e.g., email, text or chat when appropriate.

The dialog flow is based on a dialog template from a dialog author. Thus, using a multi-modal application flow tool, an application author can integrate dialog transitions between states in the dialog templates for, e.g., voice, web/Internet and wireless application protocol or other communications modes. Similarly, user interfaces by which services are presented to requesters are designed as user interface templates by user interface template designers.

User interfaces are designed, developed and tested in accordance with appropriate user interface specifications, such that different user interfaces may be provided for different service components of a single service. User interfaces for web tools may be created using, e.g., Front Page or Flash. Other user interface authoring tools are used to design user interfaces for other types of communications modes, such as wireless application protocol user interfaces. The user interface templates for dialog templates and dialog flows in different communications modes may be stored together in a user interface content repository. The integration of transitions between states in different communications modes requires that different user interfaces used to provide the service are individually designed, developed and tested in accordance with different appropriate interface specifications for each type of user interface. When a user interface template is created, the user interface template can be simulated and validated prior to development and testing. Upon approval in a development and testing process, the user interface template is converted in accordance with the mode or modes by which the service will be provided via the user interfaces. When the user interface template is to be updated or modified, the user interface template is converted back to the form (e.g., language) in which it was authored, and updates or modifications are provided before simulation, validation, development and testing are again performed.

Similarly, when a dialog template is created, the dialog template is integrated and tested prior to being stored in a content repository. When the dialog template is to be updated or modified, the dialog template is converted back to the form (e.g., language) in which it was authored, and updates or modifications are provided before simulation, validation, development and testing is again performed.

The application flow is also created in accordance with the dialog flow templates, and then different dialog flow templates for different communications modes are integrated and tested. Custom dialog engines and markup language tools, including state chart extensible markup language (SCXML), can be used to design application flow templates. Thus, an application flow is created and completed in accordance with dialog rules for different communications modes, so that an application flow proceeds in accordance with multi-modal dialog rules in a common rule set. The application flow is stored in a content repository once completed. When the application flow is to be updated and modified, the application flow is separated into the underlying dialog templates, and the underlying dialog templates are then modified and updated. Thus, an application flow can be converted into rules of a first user interface specification so as to determine the manner in which user interface templates are populated in an application flow to provide a service.

As described above, user interfaces are created, simulated, validated, developed and tested separately from the dialog template creation, integrating and testing. User interface templates and integrates rules for populating the user interface templates are stored in usable forms in one or more repositories from which the user interface templates can be retrieved and populated for service requesters as appropriate. The different user interface templates can be retrieved, converted and updated when required.

Similarly, dialog templates are created and integrated into dialog flows, which are in turn integrated into multi-modal application flows. Application flows are stored in a common usable form from which the application flows can be retrieved and used to provide the service to requesters via the user interfaces. The application flows can be broken down into individual dialog flow components and converted back to templates for modification and updating when required.

Dialog flows for individual service components can be provided sequentially in an application flow, or interspersed amongst one or more other dialog flows in the application flow. Thus, an application flow may transition between different states in different communication modes as appropriate.

User interface templates and rules for populating the user interface templates may be stored as, e.g., extensible markup language templates in a Java content repository. The extensible markup language templates and rules can be retrieved for periodic updates by a runtime engine or content management system (CMS).

Rules engines for designing and maintaining the integrated dialog and application flows may be provided by a business rule management system suite of tools used to build custom systems that extract business policies out of software. Using such a business rule management system, the policies can then be directly authored, modified and managed independently from the underlying software system. Exemplary business rule management systems are provided by ILOG Inc., RedHat (JBoss Rules) and FairIsaac (Blaze), and such rules engines can be adapted to author and maintain integrated application flows for multi-modal services as described herein.

The phase for developing multi-modal/multi-channel applications in accordance with the present disclosure broadly includes creating and storing user interface templates using different user interface development tools for different communications modes. The user interface templates can be retrieved and modified for use in individual dialogs in a dialog flow of an application flow. The user interface templates and user interfaces can be created and modified using tools such as a website authoring tool (including multimedia web authoring tools and wireless application protocol authoring/conversion tools) or voice user interface development tools.

The development phase also broadly includes creating and storing application flow documents and dialog flow documents for the application flows using any application flow/dialog flow management systems, such as Rete-based systems and Excel Sheets-based systems. The application flow documents and dialog flow documents can be retrieved and modified to create application flows, dialog flows and individual dialogs for a service to be provided.

User interface templates and rules for populating the templates can be stored in a user interface repository, and can be linked to individual dialogs in a dialog flow of an application flow to create a service application for presentation to users. User interface templates and user interface rules are separated from dialog flows but linked using predefined variables and data sets so that user interface templates and populating rules can be retrieved when called for by individual dialogs in a dialog flow of a service application for presentation to the user. As a result, any appropriate user interface development tool can be used to create and modify a user interface template and user interface, and any appropriate dialog management system can be used to create and modify dialog flow documents and an individual dialog flow of an application flow.

Accordingly, the present invention leverages authoring tools to integrate user interfaces and dialog templates and flows for individual communications modes into multi-modal/multi-channel applications. Business rules and application rules are defined in a centralized rules engine by which rules for user interaction behavior can be easily modified, and different templates can be used for different channels.

According to aspects of the present disclosure, a service provider may create a target architecture to leverage existing available tools for different modes like voice, web and wireless application protocol/mobile platform, and then integrate these different tools so as create a multi modal application. Exemplary tools and toolkits for creating user interfaces for a particular dialog in a user flow are known to include a wireless application protocol tool, a web tool kit, and an interactive voice response toolkit. The toolkits enable a user interface designer to create, edit and administer user interfaces for dialogs in dialog flows for each of these communications modes.

In addition, tools for the application flow may be used to create, edit and administer an application flow that includes the dialog flow for the service components in the various communications modes. The application flow tools may be used to create, edit and administer a pluggable application flow manager and/or dialog manager to be plugged into the multi-modal/multi-channel application tool architecture.

Once the various individual dialogs are created, rules for presenting service components in dialog flows of applications flows are created and stored as a common rule set that is used to transition for and between dialogs in the different service components. The rule sets can be recreated and edited. The rule sets are used to manage user interface presentations for individual dialogs, as well as to manage transitions between dialogs both within a service component in a single mode and between different service components in different modes.

According to another aspect of the present disclosure, user interface templates are cleanly separated from dialog management and application flow management. That is, user interface templates for individual dialogs are created using user interface authoring tools, and dialog flow and application flow are created using a rule engine platform. User interface templates and user interfaces are separated from dialogs, dialog flows and application flow. Communication is established between the user interface templates and user interfaces and the dialogs, dialog flows and application flows using a set of predefined variables and data sets. Once this separation is achieved a user interface development tool adhering to a user interface specification can be plugged into the tool architecture described herein.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission (IP, VoIP) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing a communication service, comprising:
   setting, using a computer with a processor and a memory, instructions for both a first component of a service and a second component of the service, the instructions setting a flow of dialogs to present to requesters of the service to obtain information, each dialog being presented to the requesters of the service to obtain information;
   providing, using the flow of dialogs set by the instructions, the first component of the service via a first user interface over a first communication channel using a first communication mode;
   providing, using the flow of dialogs set by the instructions, the second component of the service via a second user interface over a second communication channel using a second communication mode,
   wherein the first component of the service and the second component of the service are provided continuously in a single session in accordance with the instructions using a common rule set of the instructions.

2. The method according to claim 1,
   wherein the first component and second component are implemented using different communication standards.

3. The method according to claim 1,
   wherein the first component and second component are implemented using different communication protocols.

4. The method according to claim 1,
   wherein the first component and second component are implemented using different programming languages.

5. The method according to claim 1,
   wherein the first user interface is provided in accordance with a first user interface specification, and
   wherein the second user interface is provided in accordance with a second user interface specification.

6. The method according to claim 1,
   wherein a first user interface template used to generate the first user interface and a second user interface template used to generate the second user interface are stored and accessed separate from a rules engine used to manage transitions for and between the first component and the second component of the service, and
   wherein the first component of the service and the second component of the service are integrated in accordance with a single script of instructions for agents to follow.

7. The method according to claim 6, further comprising:
   determining, using the rules engine, the flow of dialogs set by the instructions; and
   providing the first component of the service and the second component of the service using the flow of dialogs.

8. The method according to claim 6, further comprising:
   determining, using the rules engine, an application flow which includes providing the first component of the service and the second component of the service using the flow of dialogs.

9. The method according to claim 6,
   wherein a set of predefined variables are used to provide the first component of the service and the second component of the service in accordance with rules of the rules engine.

10. The method according to claim 9,
    wherein providing the first component of the service and providing the second component of the service vary in accordance with the predefined variables.

11. The method according to claim 6, further comprising:
    storing the first user interface template and the second user interface template in a content repository.

12. The method according to claim 5, further comprising:
    integrating rules of the first user interface specification and rules of the second user interface specification with an application flow which includes providing the first component of the service and the second component of the service using the flow of dialogs.

13. The method according to claim 5, further comprising:
    converting an application flow which includes providing the first component of the service using the flow of dialogs into rules of the first user interface specification;
    updating the rules of the first user interface specification; and
    converting the updated rules of the first user interface specification back to the application flow which includes providing the first component of the service using the flow of dialogs.

14. The method according to claim 1,
    wherein the first component is arranged by a first tool and the second component is arranged by a second tool distinct from the first tool.

15. A method of providing a communication service, comprising:
    setting, using a computer with a processor and a memory, instructions for both a first component of a service and a second component of the service, the instructions setting a flow of dialogs to present to requesters of the service to obtain information, and each dialog being presented to the requesters of the service to obtain information;
    providing, using the flow of dialogs set by the instructions, the first component of the service via a first user interface over a first communication channel using a first communication mode;
    providing, using the flow of dialogs set by the instructions, the second component of the service via a second user interface over a second communication channel using a second communication mode,
    wherein the first component of the service and the second component of the service are provided in accordance with rules of stored user interface specifications used to manage transitions for and between the first component of the service and the second component of the service.

16. The method according to claim 15,
    wherein the transitions from the first component of the service to the second component of the service are based on interaction with a requester of the service.

17. The method according to claim 15,
    wherein the first component of the service and the second component of the service are provided continuously in a single session.

18. The method according to claim 15,
wherein an application flow manager manages the service transition from the first component of the service to the second component of the service.

19. The method according to claim 15,
wherein an application flow manager manages the transition from the first component of the service to the second component of the service using transition rules that selectively determine which of a plurality of components of the service to provide as the second component of the service.

20. An apparatus for providing a communication service, the apparatus comprising:
a memory that stores instructions, and
a processor that executes the instructions, wherein, when executed, the instructions cause the apparatus to perforin acts comprising:
setting instructions for both a first component of a service and a second component of the service, the instructions setting a flow of dialogs to present to requesters of the service to obtain information, and each dialog being presented to the requesters of the service to obtain information;

providing, using the flow of dialogs set by the instructions, the first component of the service via a first user interface over a first communication channel using a first communication mode;

providing, using the flow of dialogs set by the instructions, the second component of the service via a second user interface over a second communication channel using a second communication mode, wherein the first component of the service and the second component of the service are provided continuously in a single session in accordance with the instructions using a common rule set of the instructions.

\* \* \* \* \*

UNITED STATES PATENT AND TRADEMARK OFFICE
CERTIFICATE OF CORRECTION

| | | |
|---|---|---|
| PATENT NO. | : 9,069,450 B2 | Page 1 of 1 |
| APPLICATION NO. | : 14/196212 | |
| DATED | : June 30, 2015 | |
| INVENTOR(S) | : R. Samokar et al. | |

It is certified that error appears in the above-identified patent and that said Letters Patent is hereby corrected as shown below:

In the claims,

At column 19, line 16 (claim 20, line 5), "perforin" should be -- perform --

Signed and Sealed this
First Day of December, 2015

Michelle K. Lee
*Director of the United States Patent and Trademark Office*